(12) United States Patent
Tyler

(10) Patent No.: US 7,819,163 B2
(45) Date of Patent: Oct. 26, 2010

(54) AUTOMATED DOOR ASSEMBLY SYSTEM AND METHOD

(75) Inventor: Kenneth Charles Tyler, Collins, MS (US)

(73) Assignee: Masonite Corporation, Tampa, FL (US)

( * ) Notice: Subject to any disclaimer, the term of this patent is extended or adjusted under 35 U.S.C. 154(b) by 1622 days.

(21) Appl. No.: 10/941,016

(22) Filed: Sep. 15, 2004

(65) Prior Publication Data

US 2005/0102940 A1   May 19, 2005

Related U.S. Application Data

(60) Provisional application No. 60/502,982, filed on Sep. 16, 2003.

(51) Int. Cl.
   *B29C 65/00* (2006.01)
(52) U.S. Cl. ..................... 156/563; 156/556
(58) Field of Classification Search ............. 156/558, 156/563, 556, 557, 559
   See application file for complete search history.

(56) References Cited

U.S. PATENT DOCUMENTS

| | | | |
|---|---|---|---|
| 3,367,823 A | 2/1968 | Clausen et al. | |
| 3,616,090 A | 10/1971 | Larson | |
| 3,765,993 A | 10/1973 | Raffensparger et al. | |
| 3,963,552 A * | 6/1976 | Troutner et al. | 156/299 |
| 4,342,615 A * | 8/1982 | Koch, II | 156/563 |
| 5,020,966 A * | 6/1991 | Kiker | 414/797.5 |
| 5,177,868 A | 1/1993 | Kyle et al. | |
| 5,415,943 A * | 5/1995 | Groger et al. | 428/537.1 |
| 5,588,996 A * | 12/1996 | Costello | 118/668 |
| 5,665,197 A | 9/1997 | Fujii et al. | |
| 5,776,292 A * | 7/1998 | Fujii et al. | 156/299 |
| 6,067,699 A | 5/2000 | Jackson | |
| 6,085,813 A | 7/2000 | Elliott et al. | |
| 6,125,901 A | 10/2000 | Englisch et al. | |
| 6,811,647 B1 * | 11/2004 | Graf et al. | 156/264 |
| 7,501,037 B2 | 3/2009 | Stroup et al. | |
| 2002/0100996 A1 | 8/2002 | Moyes et al. | |
| 2003/0173734 A1 * | 9/2003 | Wong et al. | 271/198 |

* cited by examiner

*Primary Examiner*—John L Goff
(74) *Attorney, Agent, or Firm*—Berenato & White, LLC

(57) ABSTRACT

The present invention is directed to a method of making a door having first and second door facings and an internal doorframe. An interior side of a first facing is coated with quick acting adhesive. A frame is placed on the coated interior side about the periphery of the first facing. The frame is then coated with quick acting adhesive. An interior side of a second facing is placed on the coated frame. The facings and frame assembly are then compressed to form a door. The present invention also provides for an automated system of making the door.

24 Claims, 5 Drawing Sheets

AUTOMATED DOOR ASSEMBLY SYSTEM AND METHOD

CROSS REFERENCE TO RELATED APPLICATION AND CLAIM TO PRIORITY

This application claims priority of provisional application Ser. No. 60/502,982 filed Sep. 16, 2003, the disclosure of which is incorporated herein by reference and priority to which is claimed pursuant to 35 U.S.C.§120.

FIELD OF THE INVENTION

The present invention is directed to a method of making a door having first and second door facings and an internal doorframe. An interior side of the first facing is coated with quick acting adhesive. The frame is placed on the coated interior side about the periphery of the first facing. The frame is then coated with quick acting adhesive. An interior side of the second facing is placed on the coated frame. The facing and frame assembly are then compressed to form a door. The present invention also provides for an automated system of making the door.

BACKGROUND OF THE INVENTION

Molded doors are assembled using two door facings, often molded from a wood fiber/resin compound. The door facings form the outer surfaces of the door. Such doors often include an internal frame that provides structural support. The frame typically includes stiles and rails located around the perimeter of the door. The door may also include a core material, such as expandable cardboard material, particleboard, medium density fiberboard, or other some other one-piece core component.

Manual assembly of molded doors is relatively labor intensive, expensive, and subject to quality variations. A door facing is manually placed on a production table with its intended, exteriorly disposed surface face down. The parts of a frame, comprising individual stiles and rails, are then passed through a roll coater by hand. The roll coater applies conventional glue to opposing sides of the frame parts. The coated frame parts are then placed on top of the door facing that is on the table. A second door facing is then placed on the frame parts. The resulting assembly is then indexed downwardly so that another door may be assembled. The assembly must be carefully moved, given the components can easily shift at this point.

Manual assembly of the next molded door is repeated as described above, with each successive assembly being stacked on top of the previous assembly until a predetermined quantity of door assemblies has been stacked on the table. The table of door assemblies is then transported to a press, and the stack is placed in the press. The press applies pressure to the entire stack for a period of time sufficient to allow the glue to sufficiently bond the door assemblies. Conventional glues may take about one hour or more in-press before the door reaches "green" strength. A door achieves green strength when the glue has reached sufficient bonding strength to hold the door components together for further handling. Once green strength is achieved, the doors may be removed from the press and moved to an in-process inventory until the glue reaches maximum cure strength. Depending on the glue used, the doors may need to remain in inventory for a relatively long period of time, for example four hours or more, or even twenty-four hours or more, before the glue reaches maximum bonding strength. After maximum bonding strength is achieved, the doors are moved to a final processing station. Final processing includes edge trimming the doors to customer specification and coating and/or painting the door skins and exposed edges of the stiles and rails around each door perimeter. Therefore, manufacturing time for a door using conventional methods may be twenty-four hours or more, from the time production is initiated to the resulting finished door.

Various attempts have been made to automate production of interior molded doors. However, the production equipment necessary is often very expensive, and the methods used overly complex. Production capability from a single manufacturing facility is often limited. In addition, the glues used typically require curing presses, which are relatively expensive. Furthermore, such glues require a relatively long period of time before green strength is achieved, as well as a relatively long period of time before maximum cure strength is achieved, which is impractical in an automated production system.

As such, conventional systems and methods for automated door assembly have not proven to be cost efficient. Therefore, there is a need for an automated door assembly system and method that is cost efficient, and that achieves final product quality that is desirable to consumers.

SUMMARY OF THE INVENTION

The present invention is directed to a method of making a door. An interior side of a first facing is coated with quick acting adhesive. A doorframe is placed on the coated interior side about the periphery of the first facing. The frame is then coated with quick acting adhesive. An interior side of a second facing is placed on the coated frame. The facings and frame are compressed, thereby forming a door.

The present invention is also directed to a system for making a door. The system includes first and second stations, each for receiving a plurality of door facings. A conveyor operably associated with the first station receives and transports in a first direction an exterior surface of a door facing. A third station operably associated with the conveyor applies quick acting adhesive on an interior surface of the door facing. A fourth station operably associated with the conveyor positions a doorframe onto the adhesive covered interior surface of the door facing. A fifth station operably associated with the conveyor applies quick acting adhesive on the doorframe. A transfer mechanism operably associated with the second station positions an interior surface of a facing from the second station onto the adhesive covered doorframe. A compression station operably associated with the conveyor compresses the facings and the doorframe, thereby forming a door.

DETAILED DESCRIPTION OF THE INVENTION

Figure 1:
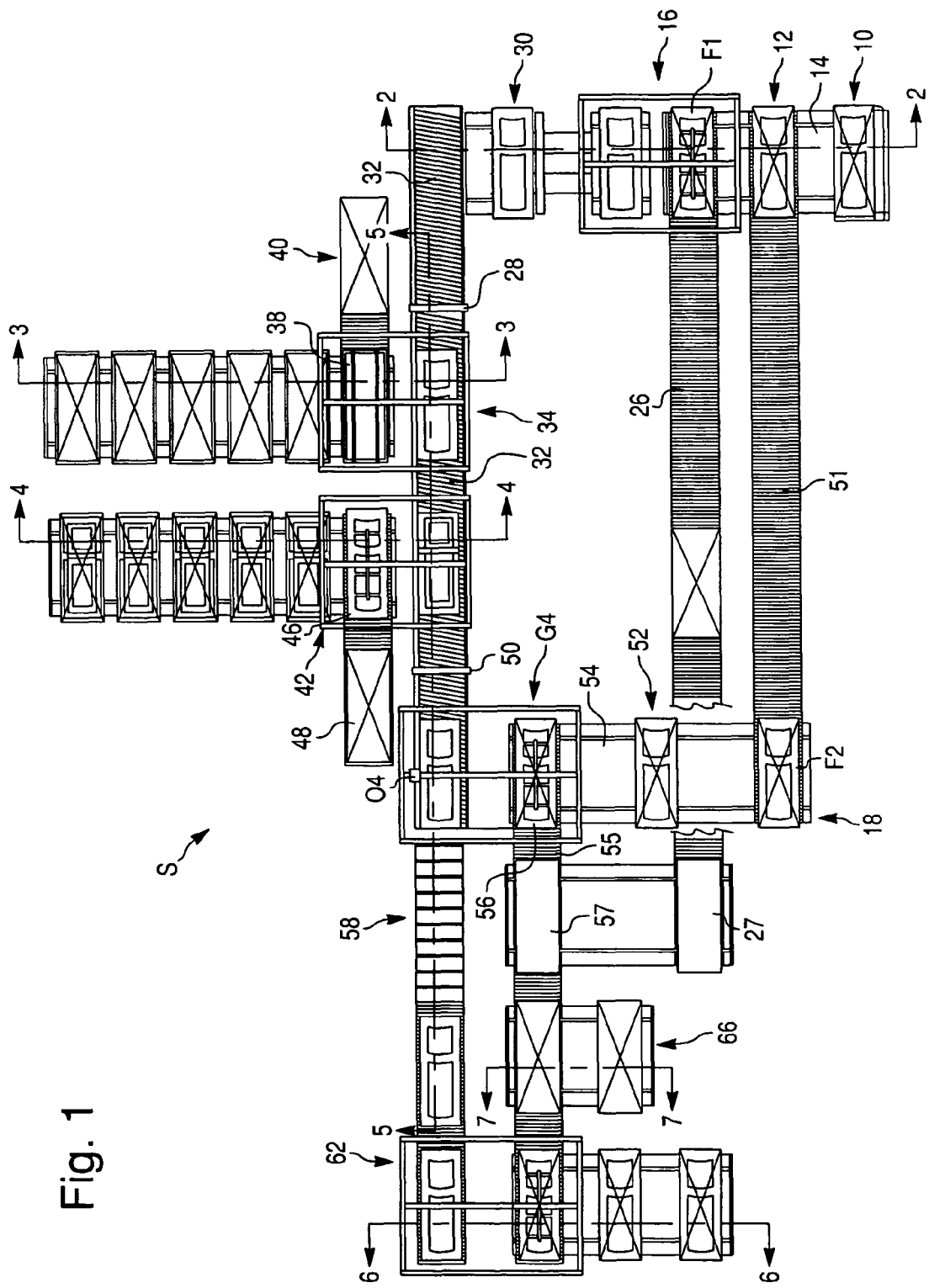
FIG. 1 is a schematic diagram of a system for making a door according to a preferred facility layout of the present invention.

A preferred facility layout of a system S for making doors according to the present invention is best shown in FIG. 1. System S includes a loading station 10 for receiving door facings. Pallet loads of door facings may be transported to loading station 10 by fork truck. For example, each pallet load may include 200 door facings. From loading station 10, pallets may be transported to a distribution station 12 via a loading conveyor 14.

From distribution station 12, pallets are transported to either a first station 16 for processing a first door facing F1 of a door being manufactured, or a second station 18 for processing a second door facing F2 on the opposing side of the door. Preferably, the first three pallets of door facings received at distribution station 12 are directed to first station 16. The next three pallets of door facings received at distribution station 12 are directed to second station 18. Door facings F1, F2 may be made from a wood fiber composite, hardboard, steel, polymer and like materials used to manufacture door skins. Preferably, door facings F1, F2 are contoured, although flush doors may be manufactured through use of system S.

Figure 2:
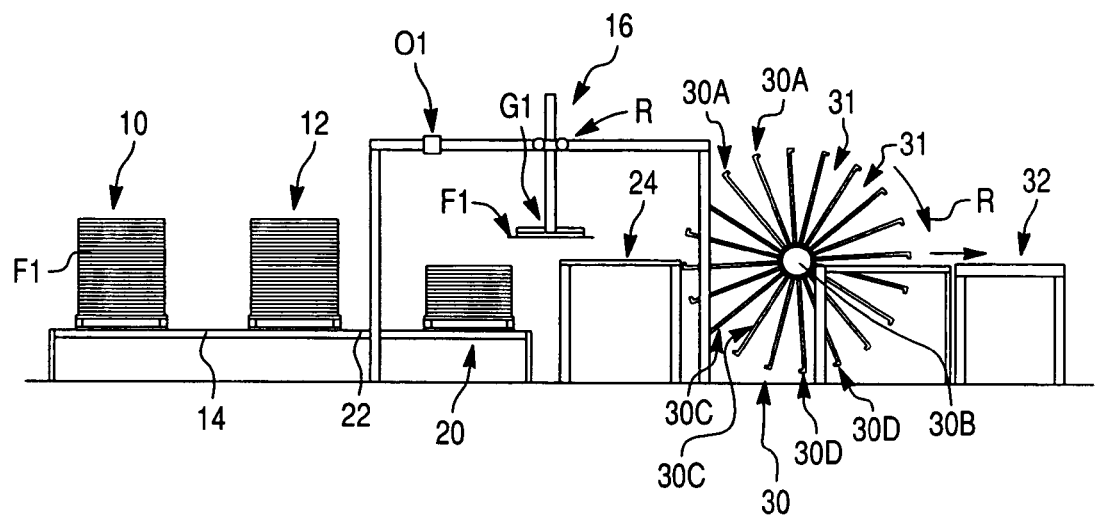
FIG. 2 is a side elevational view of a portion of the facility layout of FIG. 1 taken along line 2-2 and viewed in the direction of the arrows.

As best shown in FIG. 2, pallets of door facings F1 may be transported from distribution station 12 to a receiving port 20 of first station 16 via a first station conveyor 22. From receiving port 20, each door facing F1 is transported to a feed port 24 of first station 16. Preferably, a gantry device G1 using a suction or vacuum mechanism lifts one facing F1 from the pallet at receiving port 20, transports facing F1 to feed port 24, and places facing F1 thereon. Gantry device G may move along rails R for transporting facing F1.

An optical sensor O1 is preferably associated with receiving port 20 for sensing when a pallet received therein is empty. When the sensor senses an empty pallet, the empty pallet is moved onto a first station pallet conveyor 26, as best shown in FIG. 1. Empty pallets may be pushed onto pallet conveyor 26 using an actuator. The empty pallets are transported to a pallet storage port 27. Another full pallet is then forwarded into position from distribution station 12 to receiving port 20 via first station conveyor 22.

Data from optical sensor O1 in receiving port 20 is preferably communicated to distribution station 12. Once an empty pallet is discharged from receiving port 20, and moved out of first station 16 via pallet conveyor 26, distribution center 12 automatically forwards the next pallet into position in first station 16. Alternatively, the timing and rate of door skin depletion at first and second stations 16, 18 may be controlled by a programmable logic controller ("PLC"). Distribution station 12 may coordinate distribution of pallets according to a determined rate of depletion of pallets at first and second stations 16, 18.

Although FIG. 2 depicts one stack of pallets in loading station 10, one stack of pallets in distribution station 12, and one stack of pallets in receiving port 20, system S may accommodate additional stacks of pallets. For example, loading conveyor 14 and/or first station conveyor 22 may be extended in length to accommodate more than one stack of pallets. As such, FIG. 2 is provided for purposes of explanation only, and the invention is not so limited. The precise configuration of system S may also depend on the specific requirements of a manufacturing facility and/or available space. However, first and second stations 16, 18 preferably can hold a combined minimum of at least six pallets.

From feed port 24, door facing F1 is transported to a third station 28, where door facing F1 is coated with a quick acting adhesive, as best shown in FIG. 1. Preferably, feed port 24 is operably associated with a star conveyor 30, which places facings F1 onto a production conveyor 32 leading to third station 28. Star conveyor 30 includes openings 31 defined by cooperating supports, or wickets 30A, for receiving and holding door facings F1 from feed port 24, as best shown in FIG. 2. Wickets 30A extend outwardly from a central member 30B like spokes on a wheel. Each wicket 30A includes a planar member 30C extending outwardly from central member 30B. A leg 30D extends substantially perpendicular to the planar member 30C at the outermost end of each wicket relative to central member 30B. Legs 30D extend outwardly from planar member 30C in the direction of rotation of star conveyor 30, as shown by arrow R in FIG. 2.

Feed port 24 is preferably a conveyor that moves facings F1 into openings 31 of star conveyor 30. Feed port 24 transports one facing F1 into an opening 31. Facing F1 is thereby pushed into opening 31 until the forwardly moving edge of facing F1 contacts central member 30B. Once a facing F1 has indexed into opening 31, star conveyor 30 rotates several degrees, thereby rotating facing F1. The next adjacent opening 31 is thereby ready to receive the next facing F1 from feed port 24.

Legs 30D on wickets 30A keep facings F1 from sliding off of planar members 30C. However, facings F1 are not clamped into star conveyor 30. Therefore, as star conveyor 30 rotates, each facing eventually falls forward in direction R onto the forwardly disposed, adjacent planar member 30C of wicket 30A due to gravity. Typically, each facing F1 will fall forward after having been rotated 90° or more by star conveyor 30. Star conveyor 30 continues to rotate each facing F1 about 180°. Each facing F1 then slides off the wicket 30A onto production conveyor 32 when wicket 30A is downwardly sloped relative to central member 30B. Tangential forces created during rotation of facing F1 also cause facing F1 to slide onto production conveyor 32.

Preferably, a door facing F1 is indexed from feed port 24 into an opening 31 every 10 to 12 seconds. More preferably, star conveyor 30 includes twenty openings 31 and holds 10 facings F1, with wickets 30A rotating 18° every three seconds. The conveyor of feed port 24 and production conveyor 32 are positioned so that ten openings are above the conveyors and ten openings are below the conveyors. After ten openings (or ½ of the openings) have received door facings F1, a door facing F1 is released onto production conveyor 32 with each successive rotation of star conveyor 30. This, in turn, moves one of the empty openings into position adjacent feed port 24, and another facing F1 indexes into a corresponding opening 31.

Door facings F1 are thereby "flipped" onto production conveyor 32 from feed port 24. Typically, door facings are stacked on a pallet with the intended interior surface of each door facing stacked on top of the intended exterior surface of the next facing in the stack. However, door facing F1 is placed onto production conveyor 32 so that the intended interior surface of each facing F1 is "face up", with the intended exterior surface of facing F1 placed against production conveyor 32. In this way, the intended interior surface of door facing F1 is exposed for coating at third station 28.

Preferably, the quick acting adhesive applied at third station 28 is a hot melt, polyurethane reactive (PUR) adhesive. However, other quick acting adhesives known in the art may also be used. The adhesive may be heated for application, and sprayed onto the interior surface of each facing F1 by spray headers. The spray headers may include multiple spray nozzles, which apply an even coat of adhesive on the entire surface. Alternatively, the spray headers may be adjusted for selectively coating portions of the interior surface. The width and thickness of the adhesive applied may also be adjusted depending on the desired amount of adhesive and/or the width of the door being assembled. Depending on the specific formulation of the adhesive, it has an "open time" in which components can be moved around prior to the glue achieving hardening strength. These open times can vary from less than a minute to several hours. However, the quick-acting adhesive has sufficient tackiness so that the components do not shift as the components proceed in the manufacturing process.

Figure 3:
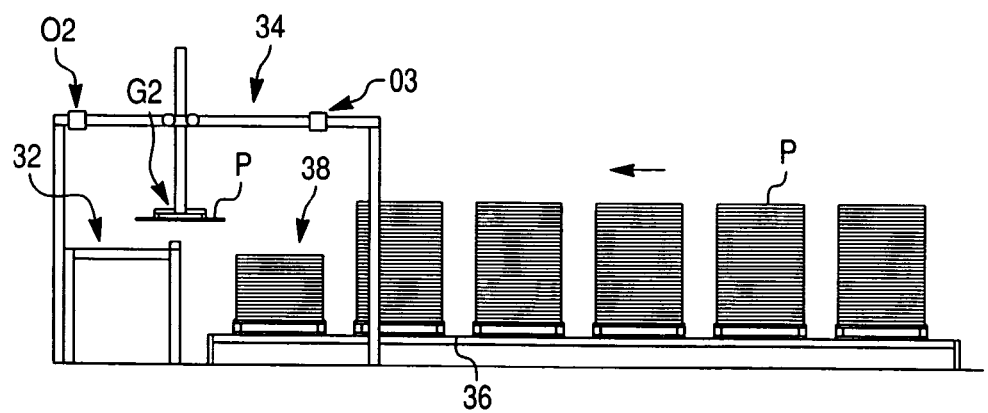
FIG. 3 is a side elevational view of a portion of the facility layout of FIG. 1 taken along line 3-3 and viewed in the direction of the arrows.

After the adhesive has been applied to the interior surface of door facing F1, door facing F1 is transported via production conveyor 32 from third station 28 to a fourth station 34, as best shown in FIGS. 1 and 3. At fourth station 34, stiles and rails are positioned onto the adhesive covered interior surface of door facing F1. Preferably, the stiles and rails are pre-assembled as a perimeter frame P. Fourth station 34 includes a fourth station conveyor 36 and a lifting gantry G2. Pallets of frames P move along conveyor 36 into a receiving port 38 of fourth station 34, wherein each frame P is lifted and placed onto a corresponding facing F1 by gantry G2. Preferably, lifting gantry G2 includes clamp-type "fingers" for lifting and moving each frame P into position. The pallets of frames P may be supplied to fourth station 34 by fork truck.

Fourth station 34 preferably includes optical sensors O2 for ensuring proper positioning and alignment of each perimeter frame P onto the adhesive covered interior surface of door facing F1. The optical sensors indicate when each door facing F1 is moving into fourth station 34 via production conveyor 32. Alternatively, fourth station 34 may include a mechanical limit switch for ensuring proper positioning of frame P on facing F1. At that time, mechanical stops elevate into position to stop movement of facing F1, and hold facing F1 in the proper position for securing the frame thereto. After frame P has been positioned onto facing F1, the mechanical stops lower and allow facing F1 to proceed along production conveyor 32.

As best shown in FIG. 1, after all of the frames P from a pallet have been used, the empty pallet is moved from receiving port 38 to a fourth station empty pallet stacker 40. An optical sensor O3 senses when the pallet in receiving port 38 is empty. The empty pallet is then removed from receiving port 38 via automatic forks similar to those used on fork trucks. The forks engage the pallet and a lifting device elevates the pallet a sufficient distance to allow clearance for the next empty pallet to be placed in the same position, for example the forks may lift the empty pallet several inches. When the next pallet is sensed to be in position by an optical sensor, the lifting device lowers the first pallet on top of the second pallet. The forks retract, and the lifting device is lowered to the original position, whereby the forks can now index into the second pallet. The stack of two pallets is then lifted to provide clearance for the arrival of the next pallet. This process is repeated until a full stack of empty pallet is achieved, for example 20 pallets. The stack of empty pallets may then be removed by fork truck.

Figure 4:
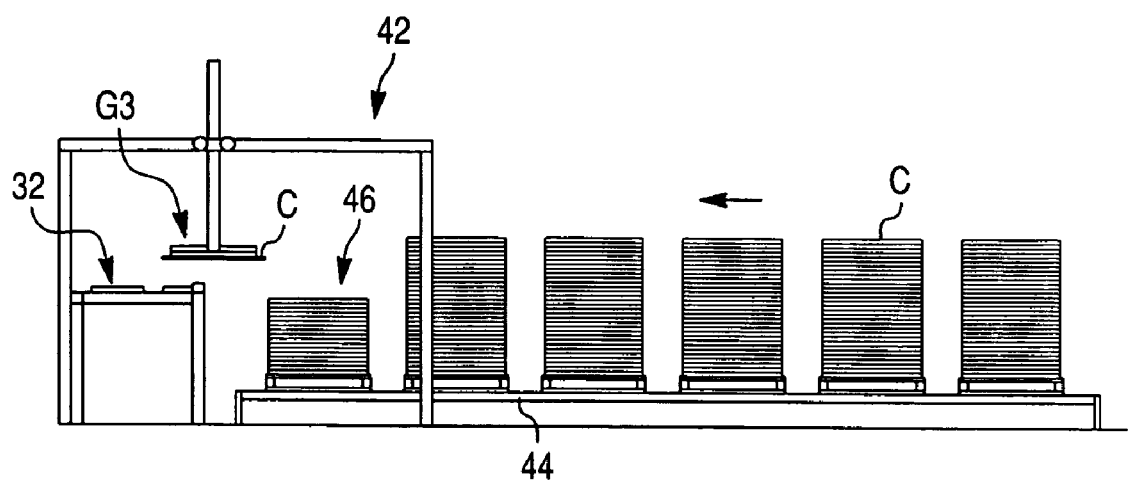
FIG. 4 is a side elevational view of a portion of the facility layout of FIG. 1 taken along line 4-4 and viewed in the direction of the arrows.

If a solid core door is desired, system S may include a fifth station 42 where a core component C is positioned onto the adhesive covered interior surface of door facing F1, as best shown in FIGS. 1 and 4. It should be understood, however, that fifth station 42 is optional, and system S may be configured for manufacturing coreless doors. Similar to fourth station 34, fifth station 42 includes a conveyor 44, which transports pallets of core components C to a receiving port 46. Each component C is then lifted and placed onto the adhesive covered interior surface of facing F1 via a gantry device G3. Gantry device G3 may be similar to gantry device G1 from first station 16, which has a suction mechanism for lifting and transporting each core C into position. Alternatively, gantry device G3 may have clamp-type fingers, similar to gantry device G2 from fourth station 34. Pallets of core components C may be supplied to fifth station 42 by fork truck. The core components may be made from cardboard, medium density fiberboard, and the like. The fiberboard may be either routed or molded to fit the contours of facings F1, F2. A preferred core component C is made from an expanded, honeycomb-type cardboard, given such material is relatively inexpensive.

As best shown in FIG. 1, after all of the core components C from a pallet have been used, the empty pallet is moved from receiving port 46 to a fifth station empty pallet stacker 48, which is similar to empty pallet stacker 40 from fourth station 34.

After core component C is placed onto adhesive covered interior surface of facing F1, door facing F1 is then transported to a sixth station 50 via production conveyor 32, as best shown in FIG. 1. The upwardly facing surfaces of perimeter frame P and core C, relative to production conveyor 32, are coated or sprayed with quick acting adhesive at sixth station 50. Preferably, a hot melt (PUR) adhesive is used, as described above. The hot melt adhesive applied at sixth station 50 is preferably, but need not be, the same quick acting adhesive applied at third station 28. The adhesive is preferably applied using spray headers, but may also be applied by roll coating or other such application methods. Portions of the perimeter frame P and/or core C may be selectively coated by adjusting the spray headers or other coating device used for applying the adhesive. For example, if a core component is not used in the manufacturing process, third and sixth stations 28, 50 may be adjusted to selective coat or spray around the perimeter of the interior surface of door facing F1 and the perimeter frame P, respectively.

After hot melt (PUR) adhesive has been applied at sixth station 50, second door facing F2 may be placed onto the adhesive covered frame P and core C. Second door facings F2 are transported from distribution station 12 to second station 18 via a second station conveyor 51. A transfer mechanism 52 is provided, which transports and positions each facing F2 from second station 18 onto the adhesive covered frame P and core component C. Transfer mechanism 52 preferably includes a transfer conveyor 54 for transporting pallets of facings F2 from second station 18 to a gantry device. As described above, pallets of facings F2 are forwarded via conveyor 54 to a transfer receiving port 56. Each facing F2 is then lifted and placed onto adhesive covered surface of frame P via gantry G4. Gantry G4 may be similar to the gantry used at first station 16, and includes vacuum cups that suction to each door facing F2 when moving each door facing F2 into position. Preferably, optical sensors O4 are provided for ensuring proper positioning and alignment of the intended interior surface of facing F2 onto adhesive covered frame P, as described above for fourth station 34.

Once all of the second door facings F2 are used from a pallet in transfer receiving port 56, empty pallets are removed via a transfer conveyor 55, and may be stored in an empty pallet storage port 57, similar to empty pallet port 27. The two empty pallet ports may be operatively connected via a conveyor, so that empty pallets may be easily removed from one empty pallet port 27 by fork truck.

Figure 5:
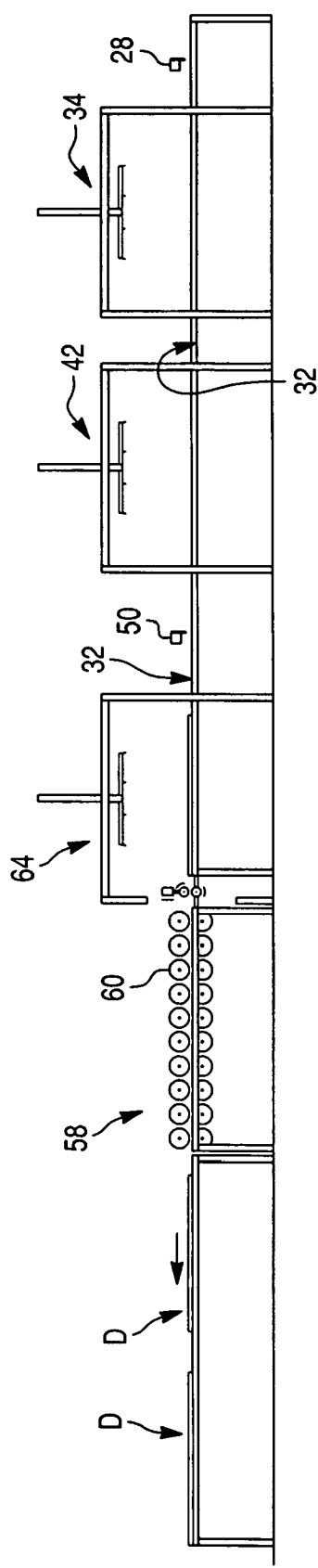
FIG. 5 is a side elevational view of a portion of the facility layout of FIG. 1 taken along line 5-5 and viewed in the direction of the arrows.

After door facings F1, F2, and frame P and core C have been assembled, the resulting assembly is transported via production conveyor 32 to a compression station 58, as best shown in FIGS. 1 and 5. Facings F1, F2, frame P and core C are compressed to form a door D. Compression station 58 preferably includes a series of pinch rollers 60 for compressing facings F1, F2 and the frame. Pinch rollers 60 provide sufficient compression for curing hot melt (PUR) adhesive, and are relatively inexpensive compared to presses required for "cold" adhesive curing. Pinch rollers 60 force door facings F1, F2 against the interior components (i.e. frame P and core C). Upon exiting pinch rollers 60, the quick acting adhesive securing the components of door D has already achieved green strength. Preferably, production conveyor 32 moves door D through compression station 58 at a rate of about 175 feet per minute. Thus, door D undergoes compression by pinch rollers 60 for only a few seconds, preferably twelve seconds or less. By contrast, conventional presses typically require a compression period of forty-five minutes or more before green strength is reached.

Figure 6:
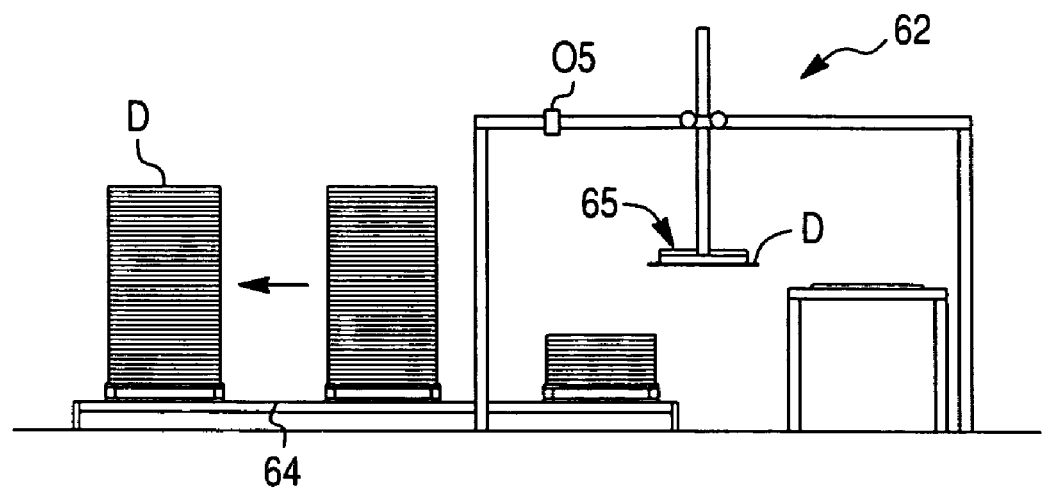
FIG. 6 is a side elevational view of a portion of the facility layout of FIG. 1 taken along line 6-6 and viewed in the direction of the arrows.

Exiting pinch rollers 60, each door D is successively stacked on a pallet at a stacking station 62, as best shown in FIGS. 1 and 6. Doors D are stacked on a pallet until a predetermined number of doors has accumulated thereon, for example forty doors per pallet. Each door is removed from production conveyor 32 and stacked onto a pallet via a gantry G5, which is similar to the other gantries described above. Stacking station 62 may include an optical sensor O5 for indicating when a pallet is full. A full pallet of finished doors is then transported via a stacking conveyor 64 to an in-process storage area for stack down time. Preferably, a stack down time of at least about thirty minutes is allowed so that sufficient adhesive strength is achieved before final processing of the doors D. Preferably, the quick acting adhesive reaches about 75% final cure strength, more preferably about 95% cure strength, during a stack down time of one hour or less. By contrast, conventional systems typically require a stack down time of between at least 4-24 hours or more before final processing may be initiated. Final processing may include edge trimming to customer specifications and/or coating the exposed edges of the frame with a protective coating or paint.

Figure 7:
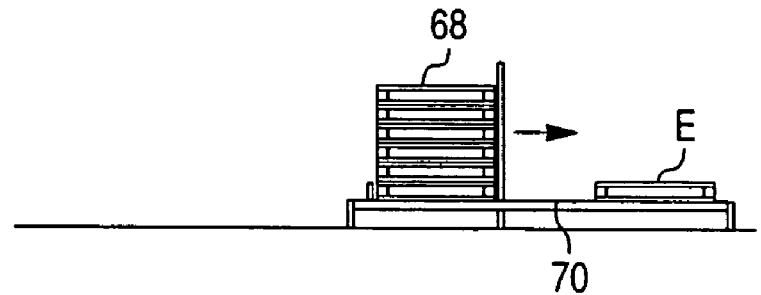
FIG. 7 is a side elevational view of a portion of the facility layout of FIG. 1 taken along line 7-7 and viewed in the direction of the arrows.

Empty pallets are supplied to stacking station 62 via a pallet station 66, as best shown in FIGS. 1 and 7. A stack of empty pallets is received at a pallet receiving port 68, unstacked via automatic forks as described above, and forwarded via a pallet station conveyor 70. Single empty pallets E are thereby staged to accept finished doors.

The process time, from application of adhesive at third station 28 to the compressed door D, is approximately one minute. Door D may then be finally processed after about one hour of stack down time, more preferably after about thirty minutes of stack down time. Preferably, no step in the production process (aside from stack down time) takes longer than twelve seconds. As such, five doors per minute, or 300 doors per hour, can be produced by system S. More than 2000 doors per eight-hour shift may easily be produced with relatively low labor costs. For example, operation of system S may be achieved with two fork truck operators and one roving operator. Thus, substantial savings in labor cost are realized. In addition, the hot melt (PUR) technology and pinch rollers 60 provide additional savings because conventional presses, required for conventional cold adhesive formulations, are relatively expensive. For example, an automated production line making 300 doors per hour using cold adhesive technology would require at least six conventional presses to achieve comparable assembly rates.

Preferably, system S can hold at least about one hour's worth of components (door facings F1, F2, frames P and core components C). For example, each pallet load of door facings received at first and second stations 16, 18 may comprise 200 facings.

The present invention is also directed to a method of making a door using system S described above. A first door facing F1 and a second door facing F2 are provided. An interior side of the first facing F1 is then coated with quick acting adhesive. Preferably, a hot melt (PUR) adhesive is sprayed on the interior side of first facing F1. Portions of the interior side of the first facing F1 may also be selectively coated with the adhesive. A frame is placed on the coated interior side about the periphery of the first door facing F1. A core component may also be placed on the coated interior side of the first door facing F1. The frame (and core) is coated with quick acting adhesive, preferably the same type of hot melt (PUR) adhesive used during the first application. An interior side of the second door facing F2 is placed onto the adhesive coated frame. The assembly is then compressed to form a door.

It will be apparent to one of ordinary skill in the art that various modifications and variations can be made in construction or configuration of the present invention without departing from the scope or spirit of the present invention. Thus, it is intended that the present invention include all such modifications and variations, provided they come within the scope of the following claims and their equivalents.

I claim as follows:

1. A system for making a door, comprising:
   a loading station for receiving a plurality of door facings;
   a distribution station;
   a transport device operably connecting the loading station and the distribution station for moving a plurality of door facings from the loading station to the distribution station;
   a first processing station;
   a transport device operably connecting the distribution station and the first processing station for moving a plurality of door facings from the distribution station to the first processing station;
   a first empty pallet storage port;
   a transport device operably connecting the first processing station and the empty pallet storage port for moving empty pallets from the first processing station to the first empty pallet storage port;
   a first adhesive coating station;
   a transport device operably connecting the first processing station and the first adhesive coating station for moving a door facing from the first processing station to the first adhesive coating station;
   a framing station for applying a frame to a door facing;
   a transport device operably connecting the first adhesive coating station and the framing station for moving a door facing from the first adhesive coating station to the framing station;
   a second adhesive coating station;
   a transport device operably connecting the framing station and the second adhesive coating station for moving a framed door facing from the framing station to the second adhesive station;
   a second processing station;
   a transport device operably connecting the distribution station and the second processing station for transporting a door facing from the distribution station to the second processing station;
   a transfer mechanism operably associated with the second processing station for positioning a door facing from said second station onto the adhesive covered door frame to create an assembled door;

a second empty pallet storage port;
a transport device operably connecting the second processing station and the second empty pallet storage port for moving empty pallets from the second processing station to the second empty pallet storage port;
a compression station; and
a transport device for transporting the assembled door to the compression station.

2. The system of claim 1, further comprising:
a stacking station;
a transport device operably connecting the compression station and the stacking station for transporting the assembled door from the compression station to the stacking station;
an empty pallet station;
a transport device operably connecting the empty pallet station and the stacking station for moving empty pallets from the pallet station to the stacking station.

3. The system of claim 2, wherein the first empty pallet port and the second empty pallet port are operably connected to one another.

4. The system of claim 3, further comprising a transport device operably connecting the first and second empty pallet ports and the empty pallet station for transporting empty pallets from the pallet ports to the pallet station.

5. The system of claim 1, wherein the transportation device connecting the distribution station and the first processing station is a conveyor.

6. The system of claim 1, wherein the first processing station comprises a gantry utilizing a vacuum device.

7. The system of claim 1, wherein the transport device connecting the first processing station and the first empty pallet station comprises a conveyor.

8. The system of claim 7, wherein the first processing station comprises an optical sensor for detecting an empty pallet and an actuator for pushing an empty pallet onto the transport device connecting the first processing station and the first empty pallet port.

9. The system of claim 8, wherein the optical sensor communicates with the distribution station to initiate a transfer from the distribution station to the first processing station.

10. The system of claim 1, wherein the transport device connecting the first processing station and the first adhesive station comprises a star conveyor and a conveyor.

11. The system of claim 1, wherein the first adhesive station and the second adhesive station comprise spray headers for spraying a quick acting adhesive.

12. The system of claim 1, wherein the transport device connecting the first adhesive station and the framing station comprises a conveyor.

13. The system of claim 1, wherein the framing station comprises a gantry utilizing a clamping mechanism.

14. The system of claim 13, wherein the framing station further comprises an optical sensor for ensuring proper positioning of the frame on the door facing.

15. The system of claim 1, further comprising a core station for applying a core component subsequent to the framing station, the core station having a gantry utilizing a vacuum device to position the core component.

16. The system of claim 1, wherein the transport device connecting the framing station and the second adhesive coating station comprises a conveyor.

17. The system of claim 1, wherein the transport device for transporting the assembled door to the compression station comprises a conveyor.

18. The system of claim 1, wherein the transport device connecting the first adhesive station to the framing station, the transport device connecting the framing station and the second adhesive station, and the transport device for transporting the assembled door to the compression station comprises a single conveyor.

19. A system for making a door comprising:
a loading station for receiving a plurality of door facings;
a distribution station;
a conveyor connecting the loading station and the distribution station for moving a plurality of door facings from the loading station to the distribution station;
a first processing station;
a conveyor connecting the distribution station and the first processing station for moving a plurality of door facings from the distribution station to the first processing station;
a first empty pallet storage port;
a conveyor connecting the first processing station and the empty pallet storage port for moving empty pallets from the first processing station to the first empty pallet storage port;
a first adhesive coating station;
a star conveyor and a conveyor connecting the first processing station and the first adhesive coating station for moving a door facing from the first processing station to the first adhesive coating station;
a framing station for applying a frame to a door facing;
a conveyor connecting the first adhesive coating station and the framing station for moving a door facing from the first adhesive coating station to the framing station;
a second adhesive coating station;
a conveyor connecting the framing station and the second adhesive coating station for moving a framed door facing from the framing station to the second adhesive station;
a second processing station;
a conveyor connecting the distribution station and the second processing station for transporting a door facing from the distribution station to the second processing station;
a transfer mechanism operably associated with the second processing station for positioning a door facing from said second station onto the adhesive covered door frame to create an assembled door;
a second empty pallet storage port;
a conveyor connecting the second processing station and the second empty pallet storage port for moving empty pallets from the second processing station to the second empty pallet storage port;
a compression station; and
a conveyor for transporting the assembled door to the compression station.

20. The system of claim 19, further comprising:
a stacking station;
a conveyor connecting the compression station and the stacking station for transporting the assembled door from the compression station to the stacking station;
an empty pallet station;
a conveyor connecting the empty pallet station and the stacking station for moving empty pallets from the pallet station to the stacking station.

21. The system of claim 20, wherein the first empty pallet port and the second empty pallet port are operably connected to one another.

22. The system of claim 21, further comprising a conveyor connecting the first and second empty pallet ports and the empty pallet station for transporting empty pallets from the pallet ports to the pallet station.

23. The system of claim 1, wherein the first processing station comprises an optical sensor for detecting an empty pallet and an actuator for pushing an empty pallet onto the transport device connecting the first processing station and the first empty pallet port.

24. The system of claim 1, wherein the first adhesive station and the second adhesive station comprise spray headers for spraying a quick acting adhesive.

* * * * *

UNITED STATES PATENT AND TRADEMARK OFFICE
CERTIFICATE OF CORRECTION

PATENT NO. : 7,819,163 B2  Page 1 of 1
APPLICATION NO. : 10/941016
DATED : October 26, 2010
INVENTOR(S) : Kenneth Charles Tyler It is certified that error appears in the above-identified patent and that said Letters Patent is hereby corrected as shown below:

In the Specifications

Column 1, line 10, change "35 U.S.C. §120" to read --35 U.S.C. § 119(e)--.

Signed and Sealed this
Sixth Day of May, 2014

Michelle K. Lee
*Deputy Director of the United States Patent and Trademark Office*